United States Patent [19]

Mueller

[11] Patent Number: 5,433,240
[45] Date of Patent: Jul. 18, 1995

[54] LOW-RATIO PROPORTIONER

[75] Inventor: Thomas D. Mueller, Lake Forest, Ill.

[73] Assignee: Crown Technology Corporation, Lake Forest, Ill.

[21] Appl. No.: 184,586

[22] Filed: Jan. 21, 1994

[51] Int. Cl.$^6$ ............................................ G05D 11/03
[52] U.S. Cl. .................................... 137/99; 417/403
[58] Field of Search ............. 137/99, 99.5, 539; 417/403

[56] References Cited

U.S. PATENT DOCUMENTS

| | | | |
|---|---|---|---|
| 2,057,364 | 10/1936 | Bystricky | 417/403 |
| 3,114,379 | 12/1963 | Cordis | 137/99 |
| 3,131,707 | 5/1964 | Cordis | 137/99 |
| 3,174,409 | 3/1965 | Hill | 417/403 X |
| 3,213,796 | 10/1965 | Cordis | 137/99 |
| 3,213,873 | 10/1965 | Cordis | 137/99 |
| 3,291,066 | 12/1966 | Cordis | 137/99 |
| 3,530,872 | 9/1970 | Arp | 137/99 |
| 4,091,839 | 5/1978 | Donner | 137/539 X |
| 4,161,308 | 7/1979 | Bell et al. | 417/403 X |
| 4,391,291 | 7/1983 | Hume | 137/99 |
| 4,477,232 | 10/1984 | Mayer | 417/403 X |
| 4,527,229 | 2/1986 | Mueller | 139/99 |
| 4,700,741 | 10/1987 | Murphy | 137/539 X |
| 5,173,036 | 12/1992 | Fladby | 417/403 |

*Primary Examiner*—Stephen M. Hepperle
*Attorney, Agent, or Firm*—Hill, Steadman & Simpson

[57] ABSTRACT

The present invention provides a self-powered proportioner which can automatically, proportionally mix two fluids in a low ratio. A fluid gating means is disposed intermediate a fluid supply and a motor piston to cause reciprocating movement of the motor piston within a motor cylinder. A connecting rod secured to the motor piston is disposed within a cavity in the housing extending between the motor cylinder and a slave pump cylinder. A slave pump piston is secured to the connecting rod for providing responsive reciprocatory movement of the slave pump piston within slave pump cylinder for pumping a second fluid. A connecting rod seal is interposed between the cavity wall and the connecting rod intermediate the motor cylinder and the slave pump cylinder preventing fluid communication through the cavity between the motor cylinder and the slave pump cylinder.

12 Claims, 2 Drawing Sheets

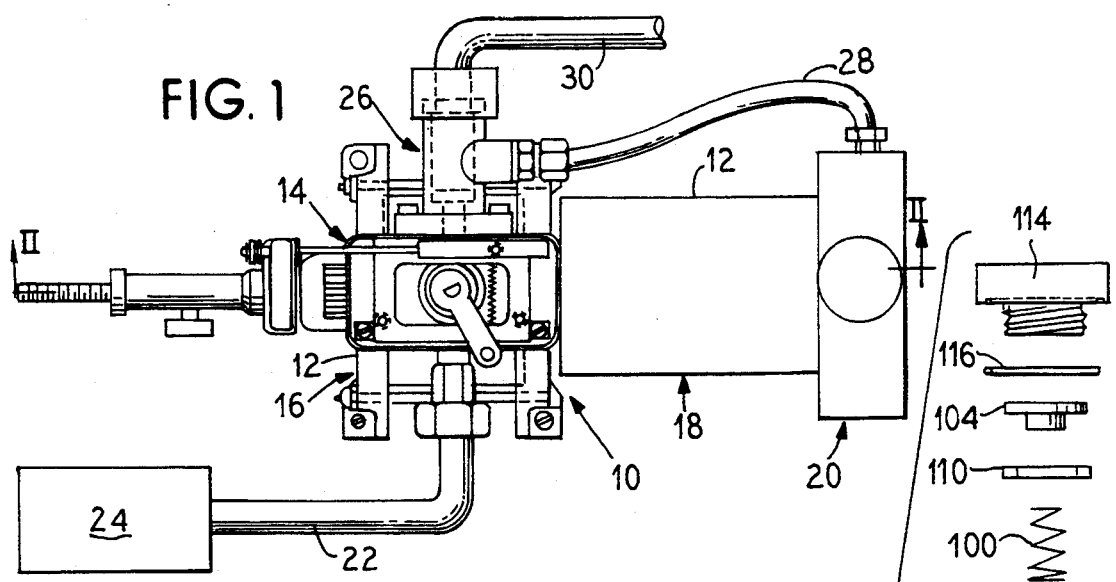
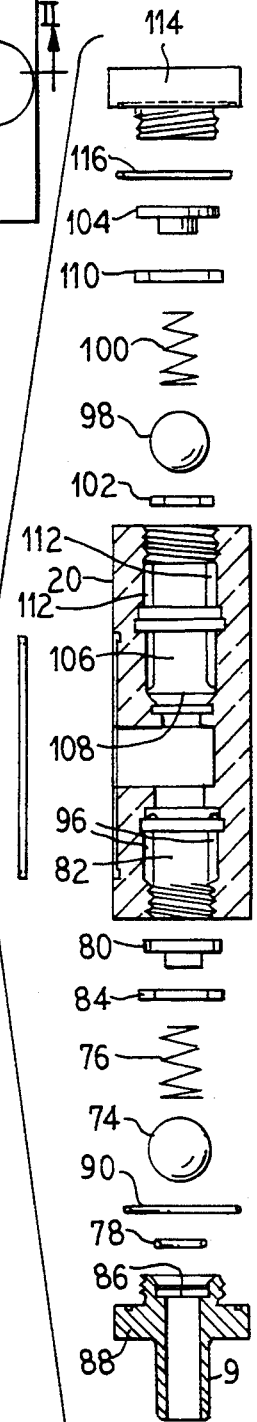
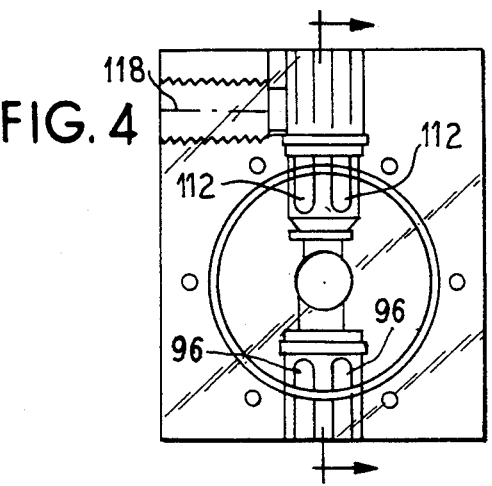
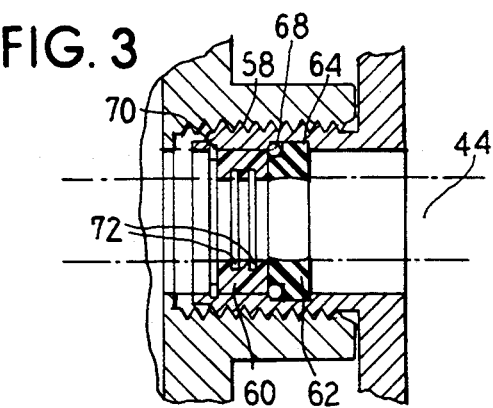

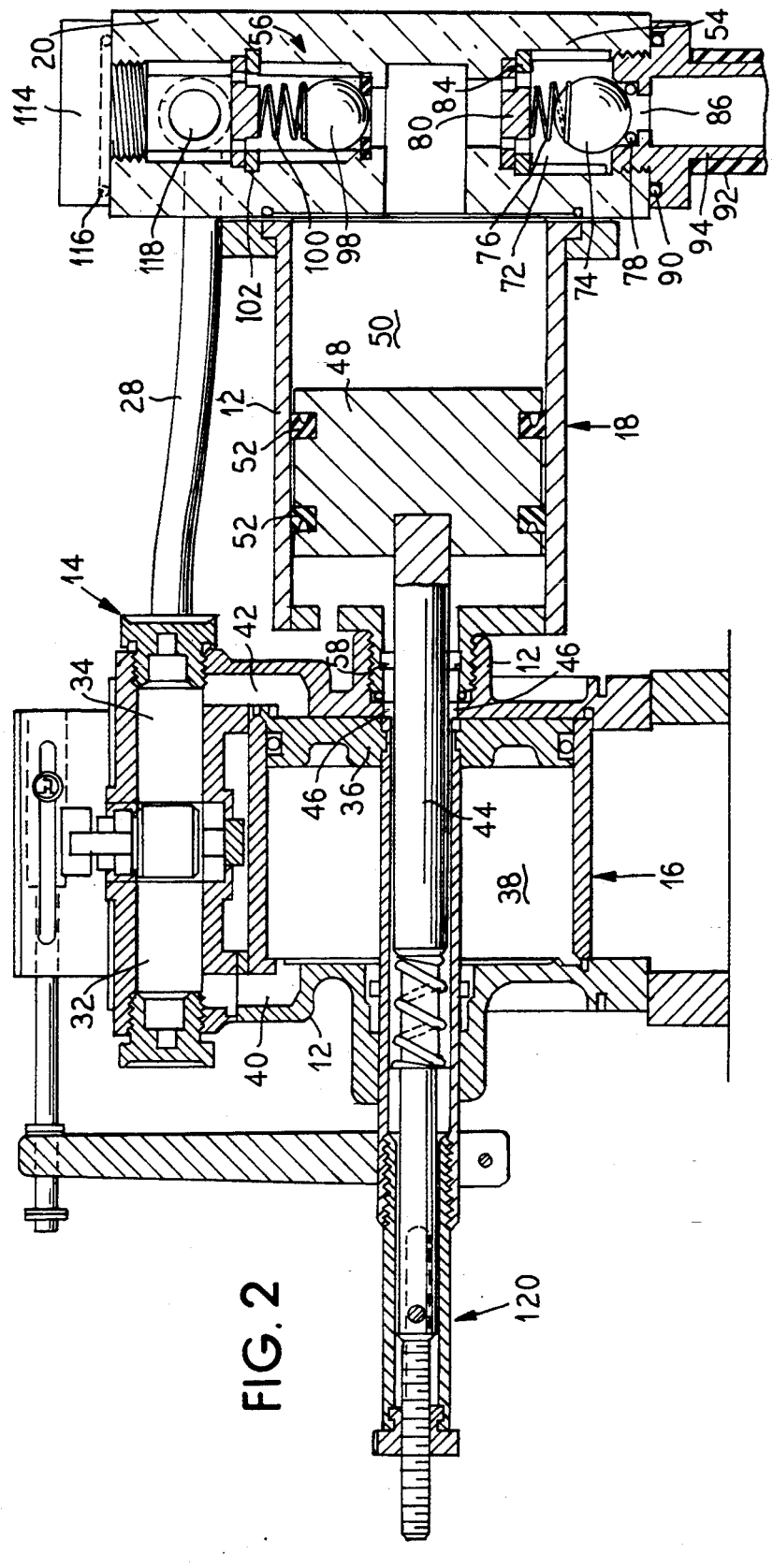
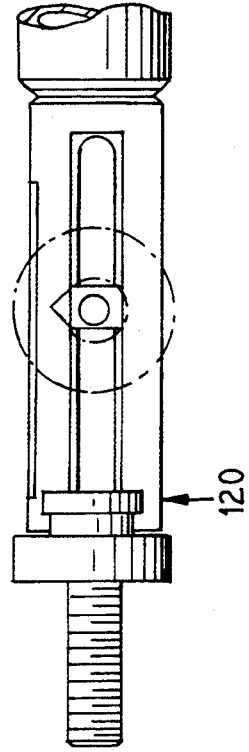
FIG. 6
FIG. 2

LOW-RATIO PROPORTIONER

BACKGROUND OF THE INVENTION

The present invention generally relates to mixing fluids. More specifically, the invention relates to the continuous mixing of two fluids in a consistent proportion into an exit stream.

The proportional mixing of fluids by automatic, self-powered devices is known. Such a device can be used to mix a fluid stream, such as water, with another fluid such as drugs, vaccines, nutrients, treating agents or the like. Traditional self-powered proportioners have a fluid motor and slave pump.

In a traditional self-powered proportioner, the pressure of a first fluid stream, such as water, is used to power the device. The first fluid stream cyclically moves a motor piston within a cylinder, automatically metering an amount of the first fluid with each stroke by filling the cylinder with fluid. A gating device alternates the fluid intake from one side of the motor piston to the other. Intake fluid pressure causes the motor piston to move, while fluid on the opposite side of the motor piston is simultaneously expelled. In one cycle of the proportioner, two displacements of the first fluid are expelled from the motor cylinder into the exit stream.

In known proportioners, the motor piston powers a slave pump. The slave pump has a slave piston and slave cylinder. The slave piston has one working side, compared to the motor piston which has two. The slave pump draws in an amount of a second fluid through an intake, then expels it through an outlet into the exit stream. The expelled second fluid mixes with the first fluid expelled from the motor piston. In one cycle, one displacement of fluid from the slave cylinder is expelled into the exit stream. Thus, constant proportions of the two fluids are mixed in each cycle. Such a proportioner is described in U.S. Pat. No. 4,572,229, issued to Thomas D. Mueller, which is incorporated herein by reference. The present invention is an improvement thereof.

In known proportioners, the slave piston is driven by a connecting rod that is connected to the motor piston. In the proportioner disclosed in U.S. Pat. No. 4,572,229, a cavity in the housing surrounding the connecting rod acts as a fluid conduit between the motor cylinder and the back of the slave piston. Thus, the back of the slave piston is exposed to the same fluid pressure as one side of the motor piston.

The fluid pressure on the back side of the slave piston imposes a force opposite to that of the motor piston. However, so long as the motor piston has a significantly larger area than the slave piston, the motion of the proportioner is not significantly impeded, despite the inefficiency caused by the back-pressure.

Proportioners have typically been used to mix fluids in a fairly high ratio, e.g., 50 parts water to 1 part additive. The slave piston is used for adding the lesser quantity of fluid. For such a ratio, the area of the slave piston is relatively small compared to that of the motor piston. A small slave piston area creates a relatively small back-pressure which can easily be overcome by the larger motor piston. Therefore, with such sizing, such a proportioner can work effectively.

However, for certain applications, there is a need to mix fluids in ratios of 4:1 or lower. To achieve lower mixing ratios, the slave piston must have a larger area than in the proportioner described above. A larger slave piston area results in a larger inefficiency, because a larger slave piston has a larger back-pressure force acting on it. If the slave piston is too large in relation to the motor piston, the power of the fluid motor cannot overcome the slave piston back-pressure and internal friction, stalling the proportioner. Thus, it has been impractical to use such a proportioner for mixing two fluids in low ratios.

A need, therefore, exists for a proportioner with maximized efficiency. A need also exists for a self-powered proportioner that can mix fluids in low ratios.

SUMMARY OF THE INVENTION

The present invention provides a proportioner which overcomes the above described deficiencies of known proportioners. More specifically, the present invention relates to a proportioner and a method of proportionally mixing two fluids. To this end, in an embodiment, a portable self-powered fluid proportioning device is provided. A fluid supply conduit supplies a first fluid. A fluid gating means is disposed intermediate said fluid supply and a motor piston to cause reciprocating movement of the motor piston within a motor cylinder. A connecting rod is secured to the motor piston for movement therewith. The connecting rod is disposed within a cavity in the housing extending between the motor cylinder and a slave pump cylinder. A slave pump piston is secured to the connecting rod for providing responsive reciprocatory movement of the slave pump piston within slave pump cylinder for pumping a second fluid. The slave pump cylinder has a diameter larger than the diameter of the cavity. A connecting rod seal is interposed between the cavity wall and the connecting rod intermediate the motor cylinder and the slave pump cylinder. The connecting rod seal prevents fluid communication through the cavity between the motor cylinder and the slave pump cylinder.

In an embodiment, a proportioning device is provided wherein the connecting rod seal comprises a rigid sleeve.

In an embodiment, a proportioning device is provided wherein the connecting rod seal comprises a resilient O-ring.

In an embodiment, a proportioning device is provided wherein the connecting rod seal comprises a rigid sleeve and a resilient O-ring, the rigid sleeve having a surface of low-friction material.

In an embodiment., a proportioning device is provided which mixes the first fluid and second fluid in a ratio of 4:1 or less.

In an embodiment, a proportioning device is provided wherein the displacement of the motor cylinder is no more than twice the displacement of the slave pump cylinder.

In an embodiment, a proportioning device is provided with a slave pump inlet valve. The slave pump inlet valve comprises an inlet checkball and an inlet spring within an inlet duct having at least one elongated channel, wherein the inlet checkball is normally biased by the inlet spring against an inlet seal wherein the inlet valve permits flow into the slave pump cylinder through the inlet duct, but prevents flow out of the inlet duct.

In an embodiment, a proportioning device is provided with a slave pump outlet valve. The slave pump outlet valve comprises an outlet checkball within an outlet duct having at least one elongated channel wherein the outlet checkball is normally biased by the outlet spring against an outlet seal wherein the outlet valve permits flow out of the slave pump cylinder through the outlet duct, but prevents flow into the slave pump cylinder through the outlet duct.

In an embodiment, a proportioning device has a spring biased lost motion connection. A slot and pin arrangement is between the connecting rod and the slave pump piston, by which the slave pump piston is continuously biased toward an end wall of the slave pump cylinder. The slave pump piston is selectively movable away from the end wall by action of an adjustable connection between the connecting rod and the slave pump piston. The connection permits an adjustable amount of movement of the connecting rod prior to effecting movement of the slave pump piston.

In an embodiment, means for biasing the slave pump piston toward an end wall of the slave pump cylinder is provided. A selectively adjustable connection means is provided between the slave pump piston and the connecting rod. A continuously adjustable pin member is captured in a slot means in the slave pump piston, whereby axial adjustment of the connection means allows selected movement of the connecting rod prior to effecting movement of the slave pump piston away from the cylinder end wall.

It is, therefore, an advantage of the present invention to provide a proportioning device that is efficient.

A further advantage of the present invention is to provide a proportioning device that can proportionally mix fluids in relatively low ratios.

Additional features and advantages of the present invention are described in, and will be apparent from, the detailed description of the presently preferred embodiments and from the drawings.

BRIEF DESCRIPTION OF THE DRAWINGS

FIG. 1 illustrates a top plan view of a proportioner embodying the principles of the present invention.

FIG. 2 illustrates a sectional view of the proportioner taken generally along the line II—II of FIG. 1.

FIG. 3 illustrates an enlarged fragmentary sectional view of the connecting rod seal.

FIG. 4 illustrates an end elevational view of the slave pump head.

FIG. 5 illustrates an exploded sectional side elevational view of the slave pump head taken generally along the line IV—IV of FIG. 4.

FIG. 6 illustrates a partial side elevational view of the adjustment mechanism.

DETAILED DESCRIPTION OF THE PRESENTLY PREFERRED EMBODIMENTS

In accordance with the invention described, with reference to the accompanying figures, wherein like numerals designate like parts, a proportioner 10 is provided for proportionally mixing two fluids. FIG. 1 illustrates such a proportioner 10. The proportioner 10 includes a housing 12, a fluid gating assembly 14, a fluid motor 16, a slave pump 18 and a slave pump head 20.

A first fluid enters the fluid gating assembly 14 through a first fluid supply tube 22 from a pressurized supply source 24. The first fluid can be water or another liquid. The first fluid exits the gating assembly 14 into a manifold 26.

A second fluid is pumped by the slave pump 18. The second fluid can be any liquid, such as one containing a drug, vaccine, nutrient, treating agent or the like. The second fluid exits the slave pump 18 through a slave pump exit line 28. The slave pump exit line 28 is connected to the manifold 26. Within the manifold 26, the first fluid mixes with the second fluid, and the resulting mixed fluid leaves the manifold 26 through the mixed stream exit line 30.

As illustrated in FIG. 2, the first fluid is gated into the fluid motor 16 alternately via port 32 or 34 to apply fluid pressure alternating sides of a motor piston 36 disposed within a motor cylinder 38 via channel 40 or 42. Simultaneously, fluid is expelled from the opposite side of the motor piston 36 via port 32 or 34. This causes cyclical motion of the motor piston 36.

The motor cylinder 38 has a first displacement volume. In each cycle, the first fluid is expelled in an amount equalling two first displacement volumes.

A connecting rod 44 is secured to the motor piston and moves therewith. The connecting rod 44 extends toward the slave pump 18 through a cavity 46 in the housing 12. The connecting rod 44 is preferably cylindrical in shape, and the cavity 46 is shaped to complementarily enclose the connecting rod 44.

The slave pump 18 comprises a slave piston 48 within a slave cylinder 50. The slave cylinder 50 has a second displacement volume. The slave piston 48 is secured to the connecting rod 44 and moves therewith. Disposed around the slave piston are piston rings 52. The piston rings 52 are preferably made of a resilient material such as rubber or plastic, and have a U-shaped cross-section. The slave pump head 20 is attached to the end of the slave cylinder 50. The slave pump head 20 includes a slave inlet valve 54 and a slave outlet valve 56.

A connecting rod seal 58 is interposed in the cavity 46 between the housing 12 and the connecting rod 44, and is shown in greater detail in FIG. 3. The connecting rod seal 58 prevents flow of the first fluid through the cavity 46. A vent 59 allows air from outside the proportioner to flow into and out of the slave cylinder 50 behind the slave piston 48. Thus, the pressure of the first fluid does not impose a back-pressure force on the slave piston 48. The connecting rod seal 58 is preferably a sleeve 60 in combination with an annular O-ring 62.

The O-ring 62 is disposed in an annular recess 64. The sleeve 60 acts as a bearing surface for the connecting rod 44. The O-ring 62 has a concave annular inner surface 66 that contacts the connecting rod 44. The O-ring 62 is preferably made of a resilient rubber or plastic material. Fitting between the recess 64 and the O-ring 62 is a pressure ring 68 which secures the O-ring 62.

The sleeve 60 fits against the O-ring 62, and is held in place by a snap-ring 70. The sleeve 60 is preferably wider than the O-ring 62 to provide an adequate surface to bear the load of the connecting rod 44, preventing lateral movement of the connecting rod 44. The sleeve 60 is preferably rigid and is constructed of, or coated with, a low-friction material, such as Teflon ®. Also, the sleeve 60 preferably has an annular inner surface having one or more annular grooves 72. The grooves 72 reduce friction between the sleeve by reducing surface contact area, while the overall bearing width is maintained. By providing a relatively wide sleeve 60, the connecting rod 44 is better supported.

The slave pump head 20 is shown in FIGS. 4 and 5, FIG. 5 being exploded to show the individual components of the slave inlet valve 54 and the slave outlet valve 56. The slave inlet valve 54 and slave outlet valve 56 are disposed in the slave pump head 20. The slave inlet valve 54 has an inlet checkball 74, an inlet spring 76, an inlet seal 78, and an inlet bridge 80 which are assembled in a slave inlet duct 82.

The inlet bridge 80 fits within the slave inlet duct 82. The inlet spring 76 fits against the inlet bridge 80. The inlet bridge 80 provides support for the inlet spring 76 within the slave inlet duct 82, but is shaped to allow fluid flow through the slave inlet duct 82. The inlet bridge 80 is held in place by a snap ring 84. The inlet spring 76 contacts the inlet checkball 74 and biases the inlet checkball 74 against the inlet seal 78 which fits in an inlet orifice 86. The inlet seal 78 is preferably an O-ring. The inlet orifice 86 is preferably formed in a threaded inlet cap 88 that is in communication with a source for the second fluid. A threaded inlet cap 88 provides access to the components of the slave inlet valve 54. The threaded inlet cap has an inlet cap seal 90 to prevent leakage. The threaded inlet cap seal is preferably an O-ring. A second fluid inlet tube 92 can be slipped onto a tubular extension 94 of the inlet orifice 86, where it is held by a friction fit.

The slave inlet valve 54 is arranged so that the inlet spring 76 biases the inlet checkball 74 against the direction of flow into the slave cylinder 50. The inlet checkball 74 compresses the inlet spring 76 to open the inlet orifice 86 to allow flow into the slave cylinder 50. The slave inlet duct 82 is configured to have elongated channels 96 which insure adequate flow around the inlet checkball 74. However, the inlet checkball 74 prevents flow out of the slave cylinder 50 by sealing against the inlet seal 78 when flow into the slave cylinder 50 ceases.

The slave outlet valve has a outlet checkball 98, an outlet spring 100, an outlet seal 102, and an outlet bridge 104 which are disposed in a slave outlet duct 106. Within the outlet duct 106 is an outlet orifice 108 against which the outlet seal 102 fits. The outlet seal 102 is preferably made of plastic or rubber. The outlet checkball 98 can rest against the outlet seal 102 to prevent flow into the slave cylinder 50. The outlet spring 100 contacts the outlet checkball 98 and normally biases the outlet checkball 98 against the outlet seal 102. The outlet spring 100 is retained by the outlet bridge 104 which is held in place by a snap ring 110.

The outlet bridge 104 fits within the slave outlet duct 106. The outlet spring 100 fits against the outlet bridge 104. The outlet bridge 104 provides support for the outlet spring 100 within the slave outlet duct 106, but is shaped to allow flow through the slave outlet duct 106. The slave outlet duct 106 is also configured to have elongated channels 112 which insure adequate flow around the outlet checkball 98.

The slave outlet valve 56 is arranged so that the outlet spring 100 biases the outlet checkball 98 against the direction of flow leaving the slave cylinder 50. The outlet checkball 98 compresses the outlet spring 100, opening the outlet orifice 108 to allow flow out of the slave cylinder 50. However, the outlet checkball 98 prevents flow into the slave cylinder 50 by sealing against the outlet seal 102 when flow out of the slave cylinder 50 ceases.

A threaded outlet cap 114 provides access to the components of the slave outlet valve 56. The threaded outlet cap 114 has an outlet cap seal 116, which is preferably an O-ring. The slave outlet duct 106 has a lateral portion 118 which is in communication with the slave pump exit line 28.

The slave pump piston 48, which moves with the connecting rod 44, draws the second fluid through the slave inlet valve 54 into the slave cylinder 50 when the slave pump piston 48 moves away from the slave pump head 20. This fills the slave pump cylinder 50 with the second fluid. The second fluid is expelled from the slave pump cylinder 50 through the slave outlet valve 56 when the slave pump piston 48 moves toward the slave pump head 20. The expelled second fluid travels through the slave pump exit line 28 to the manifold 26, where it mixes with the first fluid expelled from the motor cylinder 38. During each cycle, the slave pump 18 expels second fluid in an amount equalling one slave cylinder 50 displacement volume.

The expelled amounts of the first and second fluids are mixed in the manifold 26 in the same proportion for each proportioner cycle. Preferably, the motor cylinder 38 and slave cylinder 50 are sized so that the first fluid and second fluid are mixed in a ratio of 4:1, respectively, or lower. In such an embodiment, slave cylinder 50 is relatively large, having a diameter greater than that of the cavity 46.

Because the motor cylinder expels two displacements per cycle and the slave cylinder expels one displacement, the slave cylinder 50 must have at least half the displacement of the motor cylinder 38.

There can be an adjustment mechanism 120 on the proportioner for adjusting the ratio of first and second fluids. FIG. 6 illustrates the adjustment mechanism 120, which is described in detail in U.S. Pat. No. 4,572,229.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

What is claimed is:

1. A fluid proportioning device comprising:

means for providing a first fluid under pressure;

means for gating said first fluid to alternating sides of a motor piston to cause reciprocating movement of said motor piston within a motor cylinder;

means for expelling said first fluid from alternating sides of said motor piston into an exit stream;

means for providing a second fluid;

a slave piston within a slave cylinder;

a cavity extending between said motor cylinder and said slave cylinder;

a connecting rod secured to said motor piston for movement therewith, said connecting rod being disposed within said cavity, said slave piston being secured to said connecting rod for providing responsive reciprocatory movement of said slave piston within said slave cylinder for pumping said second fluid into said exit stream, said slave cylinder having a diameter larger than a diameter of said cavity;

means for preventing communication of said first fluid with said slave piston comprising a rigid sleeve and a resilient O-ring, wherein said sleeve and said O-ring are interposed in said cavity around said connecting rod for preventing communication of said first fluid with said slave piston; and at least one annular groove in said rigid sleeve facing said connecting rod for reducing friction between said sleeve and said connecting rod.

2. A fluid proportioning device comprising:

means for providing a first fluid under pressure;

means for gating said first fluid to alternating sides of a motor piston to cause reciprocating movement of said motor piston within a motor cylinder;

means for expelling said first fluid from alternating sides of said motor piston into an exit stream;

means for providing a second fluid;

a slave piston within a slave cylinder;

a cavity extending between said motor cylinder and said slave cylinder;

a connecting rod secured to said motor piston for movement therewith, said connecting rod being disposed within said cavity, said slave piston being secured to said connecting rod for providing responsive reciprocatory movement of said slave piston within said slave cylinder for pumping said second fluid into said exit stream, said slave cylinder having a diameter larger than a diameter of said cavity; and means for preventing communication of said first fluid with said slave piston comprising a rigid sleeve and a resilient O-ring, wherein said sleeve and said O-ring are interposed in said cavity around said connecting rod for preventing communication of said first fluid with said slave piston;

wherein said resilient O-ring has a concave annular inner surface engaged against said connecting rod.

3. A fluid proportioning device comprising:

means for providing a first fluid under pressure;

means for gating said first fluid to alternating sides of a motor piston to cause reciprocating movement of said motor piston within a motor cylinder;

means for expelling said first fluid from alternating sides of said motor piston into an exit stream;

means for providing a second fluid;

a slave piston within a slave cylinder;

a cavity extending between said motor cylinder and said slave cylinder;

a connecting rod secured to said motor piston for movement therewith, said connecting rod being disposed within said cavity, said slave piston being secured to said connecting rod for providing responsive reciprocatory movement of said slave piston within said slave cylinder for pumping said second fluid into said exit stream, said slave cylinder having a diameter larger than a diameter of said cavity;

means for preventing communication of said first fluid with said slave piston comprising a rigid sleeve and a resilient O-ring, wherein said sleeve and said O-ring are interposed in said cavity around said connecting rod for preventing communication of said first fluid with said slave piston; and a pressure ring disposed around said O-ring to tighten contact between said O-ring and said connecting rod.

4. A fluid proportioning device according to claim 1 further comprising:

an inlet valve including an inlet duct and an inlet checkball therein, said inlet valve permitting flow into said slave cylinder through said inlet duct but preventing flow out of said inlet duct;

an outlet valve including an outlet duct and an outlet checkball therein, said outlet valve permitting flow out of said slave cylinder through said outlet duct into said exit stream, but preventing flow into said cylinder through said outlet duct; and at least one of said ducts having sidewalls sized to closely surround and guide said checkball for reciprocal movement towards and away form a vane seat and having at least one channel formed in said cylinder to permit fluid to bypass said checkball when said checkball moves away from said valve seat.

5. The fluid proportioning device according to claim 1 which mixes said first fluid and said second fluid in a ratio of 4:1 or less.

6. The fluid proportioning device according to claim 1 further comprising:

a pressure ring disposed around said O-ring to tighten contact between said O-ring and said connecting rod.

7. A fluid proportioning device according to claim 2 further comprising:

an inlet valve including an inlet duct and an inlet checkball therein, said inlet valve permitting flow into said slave cylinder through said inlet duct but preventing flow out of said inlet duct;

an outlet valve including an outlet duct and an outlet checkball therein, said outlet valve permitting flow out of said slave cylinder through said outlet duct into said exit stream, but preventing flow into said cylinder through said outlet duct; and at least one of said ducts having sidewalls sized to closely surround and guide said checkball for reciprocal movement towards and away form a valve seat and having at least one channel formed in said cylinder to permit fluid to bypass said checkball when said checkball moves away from said valve seat.

8. The fluid proportioning device according to claim 2 which mixes said first fluid and said second fluid in a ratio of 4:1 or less.

9. The fluid proportioning device according to claim 2 further comprising:

at least one annular groove in said rigid sleeve facing said connecting rod for reducing friction between said sleeve and said connecting rod.

10. The fluid proportioning device according to claim 2 further comprising:

a pressure ring disposed around said O-ring to tighten contact between said O-ring and said connecting rod.

11. A fluid proportioning device according to claim 3 further comprising:

an inlet valve including an inlet duct and an inlet checkball therein, said inlet valve permitting flow into said slave cylinder through said inlet duct but preventing flow out of said inlet duct;

an outlet valve including an outlet duct and an outlet checkball therein, said outlet valve permitting flow out of said slave cylinder through said outlet duct into said exit stream, but preventing flow into said cylinder through said outlet duct; and at least one of said ducts having sidewalls sized to closely surround and guide said checkball for reciprocal movement towards and away form a valve seat and having at least one channel formed in said cylinder to permit fluid to bypass said checkball when said checkball moves away from said valve seat.

12. The fluid proportioning device according to claim 3 which mixes said first fluid and said second fluid in a ratio of 4:1 or less.

* * * * *